(12) United States Patent
Buerk et al.

(10) Patent No.: US 7,595,605 B2
(45) Date of Patent: Sep. 29, 2009

(54) METHOD AND CONTROL CIRCUIT FOR DETERMINING AN OPERATING STATE WHEN CONTROLLING A FAN MOTOR

(75) Inventors: Peter Buerk, Lichtenau-Grauelsbaum (DE); Stefan Koch, Kappelrodeck (DE)

(73) Assignee: Robert Bosch GmbH, Stuttgart (DE)

( * ) Notice: Subject to any disclaimer, the term of this patent is extended or adjusted under 35 U.S.C. 154(b) by 214 days.

(21) Appl. No.: 10/550,719

(22) PCT Filed: Oct. 21, 2003

(86) PCT No.: PCT/DE03/03479

§ 371 (c)(1),
(2), (4) Date: Jul. 12, 2006

(87) PCT Pub. No.: WO2004/086601

PCT Pub. Date: Oct. 7, 2004

(65) Prior Publication Data

US 2007/0001643 A1    Jan. 4, 2007

(30) Foreign Application Priority Data

Mar. 26, 2003  (DE) .............................. 103 13 520

(51) Int. Cl.
*H02P 27/04*   (2006.01)

(52) U.S. Cl. ............. 318/811; 318/400.21; 318/400.22; 318/599

(58) Field of Classification Search ................... None
See application file for complete search history.

(56) References Cited

U.S. PATENT DOCUMENTS

| | | | | |
|---|---|---|---|---|
| 5,218,283 A * | 6/1993 | Wills et al. | ................... | 318/748 |
| 6,054,823 A * | 4/2000 | Collings et al. | ........ | 318/400.04 |
| 6,396,231 B1 * | 5/2002 | Horng et al. | ................. | 318/471 |
| 6,512,346 B2 * | 1/2003 | Yoshimura | ................... | 318/599 |
| 6,577,482 B1 * | 6/2003 | Eisenhardt et al. | ............ | 361/84 |

\* cited by examiner

*Primary Examiner*—Walter Benson
*Assistant Examiner*—Renata McCloud
(74) *Attorney, Agent, or Firm*—Kenyon & Kenyon LLP

(57) ABSTRACT

A method is described for determining an operating state on triggering a fan motor, the fan motor being operated with the aid of a switching device, the switching device being activated via a pulse-width-modulated triggering signal, a pulse duty factor of the triggering signal predefining a triggering state of the fan motor, a voltage potential at the node between fan motor and switching device or a motor current being measured as a measured variable, an operating state being determined on triggering the fan motor as a function of the measured variable and the pulse duty factor.

5 Claims, 4 Drawing Sheets

METHOD AND CONTROL CIRCUIT FOR DETERMINING AN OPERATING STATE WHEN CONTROLLING A FAN MOTOR

FIELD OF THE INVENTION

The present invention relates to a method for determining an operating state on triggering a fan motor, in particular of a fan motor for a motor vehicle. Furthermore, the present invention relates to a control circuit for a fan motor, using which an operating state may be determined on triggering the fan motor.

BACKGROUND INFORMATION

Fan motors, e.g., for motor vehicles, are typically triggered by a control unit. For continuous triggering, the control unit generates periodic pulse-width-modulated triggering signals for this purpose, using which a field-effect power transistor is triggered. The field-effect power transistor is connected in series with a fan motor, which is connectable to the control circuit, between two supply voltage potentials. The control unit varies a pulse duty factor of the triggering signal, so that the fan motor is controlled continuously.

In a pulse-width-modulated signal, the pulse duty factor specifies the proportion of time in which the signal level is in a high state during a period of the triggering signal. In this case, the high state triggers the field-effect power transistor in such a way that it is conductive and applies the entire supply voltage to the fan motor. During a low level of the pulse-width-modulated signal, the field-effect power transistor is completely blocked, so that the supply voltage is disconnected from the fan motor.

The frequency of the pulse-width-modulated triggering signal is typically in a frequency range which may not result in audible oscillations in the fan motor and/or in the triggering electronic system.

Faults may occur during the installation and operation of the fan motor, which may typically not be easily recognized.

SUMMARY OF THE INVENTION

An object of the present invention is to provide a method for determining an operating state on triggering a fan motor, using which the operating states "open load", "triggering using overvoltage", "blocking or sluggishness of the fan motor", and/or "normal operation" may be determined. It is a further object of the present invention to provide a control circuit for a fan motor, which may determine the particular operating state of the fan motor.

According to a first aspect of the present invention, a method for determining an operating state on triggering a fan motor is provided. The fan motor is operated with the aid of a switching device, the switching device being triggered via a pulse-width-modulated triggering signal. A pulse duty factor of the triggering signal predefines a triggering state of the fan motor, a voltage potential at the node between fan motor and switching device or a motor current being measured as a measured variable. An operating state is determined on triggering the fan motor as a function of the measured variable and the pulse duty factor.

The method has the advantage that exact control is possible with the aid of the voltage potential between fan motor and switching device, the fan motor being triggered using this voltage. With the aid of the pulse duty factor, it may then be checked whether the voltage potential is in a setpoint range or whether the voltage potential deviates therefrom. The voltage potential may be used as an indicator of the operating state of the fan motor. The motor current may also be used as an indicator for the operating state.

Preferably, the measured variable is low-pass filtered, so that the measured variable is smoothed. In this way, a measured variable may be measured which is independent of the clocking of the pulse-width-modulated triggering signal. The low-pass filtered measured variable essentially still only includes the direct component of the voltage between the fan motor and the switching device and/or the direct component of the motor current, the direct component essentially being able to be viewed as proportional to the pulse duty factor.

An open-load fault may be recognized if the voltage potential essentially corresponds to the supply voltage of the fan motor applied to the switching device. An open-load fault means that no current may flow through the fan motor because there is an interruption of one of the supply lines of the fan motor and/or an electric circuit interruption within the fan motor. This is recognized by the method according to the present invention if essentially the supply potential applied to the switching device, which is essentially independent of the pulse duty factor, is measured as the voltage potential.

There is also the possibility that upon recognition of an open-load fault, the switching device will be made completely conductive for a specific period of time in order to apply the maximum voltage to the fan motor, so that merely oxidized connection points, e.g., on the brushes of the fan motor, clean themselves and a reliability performance of the fan motor is thus restored.

Normal operation is recognized when the voltage potential is essentially proportional to the pulse duty factor and the measured voltage is in a defined voltage range in relation to the applied pulse duty factor. Normal operation is thus defined in that the voltage potential rises proportionally to the pulse duty factor and the voltage potential is within a voltage range defined in relation to the particular pulse duty factor, i.e., between an upper and a lower voltage threshold.

The defined voltage range may be determined through a previously performed measurement at a defined applied supply voltage at different pulse duty factors. In this way, the operating points of the particular fan motor may be determined at different pulse duty factors, in order to be able to identify voltage deviations from the measured operating points as a malfunction.

Preferably, an overvoltage fault is recognized if the measured voltage potential is above the defined voltage range. Overvoltages may, for example, occur in motor vehicles due to malfunctions of the vehicle electrical system, the generator, the battery, or the like. In order to avoid defects of the fan motor resulting therefrom, it is necessary to recognize overvoltages in a timely manner and take suitable measures to protect the fan motor and the triggering electronic system.

Preferably, blocking or sluggishness of the fan motor is recognized if the motor current is outside a defined current range. Blocking and sluggishness may occur during the use of fan motors in motor vehicles if foreign bodies get into the fan driven by the fan motor or the rotation or start-up of the motor is obstructed by contamination or corrosion. Blocking and sluggishness typically result in the motor current rising above the current range assumed in normal operation. In order to prevent permanent damage to the motor in case of sluggishness or blocking, such an operating state must be recognized so that the motor current may be limited to a harmless value or the fan motor may be turned off, for example.

Furthermore, the defined current range may be determined through a measurement at a defined applied supply voltage at different pulse duty factors. In this way, the operating points of the particular fan motor at different pulse duty factors may be determined in order to be able to identify deviations of the motor current from the measured operating points as malfunctions.

According to a further aspect of the present invention, a control circuit for a fan motor is provided for determining an operating state on triggering the fan motor. The circuit includes a pulse width modulation circuit, which triggers a switching device using a pulse-width-modulated signal having a pulse duty factor. The switching device is connected to a first supply potential, the fan motor being connectable between a second supply potential and the switching device. Furthermore, a measuring circuit is provided in order to pick up a measured variable at a node between the switching device and the fan motor. With the aid of an analyzer circuit, the measured variable is checked and an operating state is determined as a function of the measured variable and the pulse duty factor.

With the aid of the control circuit according to the present invention, it is possible to trigger a fan motor and determine the operating state of the motor by measuring a measured variable at a voltage node on the fan motor. Therefore, the control circuit may determine at any time, by measuring the measured variable, whether measures must be taken in order to protect and/or activate the motor or whether the motor is in a normal operating state.

Furthermore, a filter circuit may smooth the measured variable, so that only the direct component of the measured variable is measured by the measuring circuit, the direct component being essentially proportional to the pulse duty factor.

A compensating circuit having a data memory may furthermore be provided in order to perform a compensation of the control circuit. The compensating circuit is connected to the measuring circuit in order to measure a reference variable at a defined applied supply voltage and with a fan motor connected, and stores the reference variable as reference values in regard to the particular pulse duty factor. In this way, a reference values table (lookup table) may be stored in the control circuit, which allows one to decide through comparison to the particular measured variable whether the fan motor is in normal operation or in some other operating state.

Preferably, the compensating circuit may store further reference values in the data memory, the compensating circuit determining the further reference values from interpolation of the measured reference values. In this way, a corresponding reference value does not have to be measured for every possible pulse duty factor, but rather further reference values may be interpolated from those already measured, under the assumption that the measured reference variable is essentially proportional to the pulse duty factor.

Preferably, the analyzer circuit checks the measured variable to determine the operating state by comparing the measured variable to the reference values stored in the data memory in regard to the particular applied pulse duty factor of the pulse-width-modulated signal and recognizing an operating state as a function of the deviation between the measured variable and the reference variable. If a measured variable is above an upper threshold of the reference value, an overvoltage is recognized. If the measured variable is at the voltage level of the first supply voltage potential, an open load is recognized, i.e., the fan motor or the supply line to the fan motor has a line interruption. If the measured voltage is between a lower and upper threshold which are determined by the stored reference voltage values, normal operation is recognized. If a measured motor current is above an upper threshold of the reference motor current, sluggishness or blocking of the fan motor is recognized.

The control circuit preferably has a data interface, in order to transmit the recognized operating state via a network, e.g., a CAN network.

The measuring circuit may be designed in such a way that a voltage between the fan motor and the switching device is measured and/or a motor current through the fan motor is measured.

The switching device preferably has a sense FET, using which the motor current through the fan motor and/or through the switching device is measured. A sense FET has the advantage that the motor current does not have to be measured via a measuring resistor, which would reduce the supply voltage applied to the fan motor.

Since a proportional current is output to measure the current through the sense FET, a transformer circuit which is connected to the sense FET is preferably provided in order to convert the motor current into a proportional voltage. The voltage is then provided to the measuring circuit.

DETAILED DESCRIPTION

Figure 1:
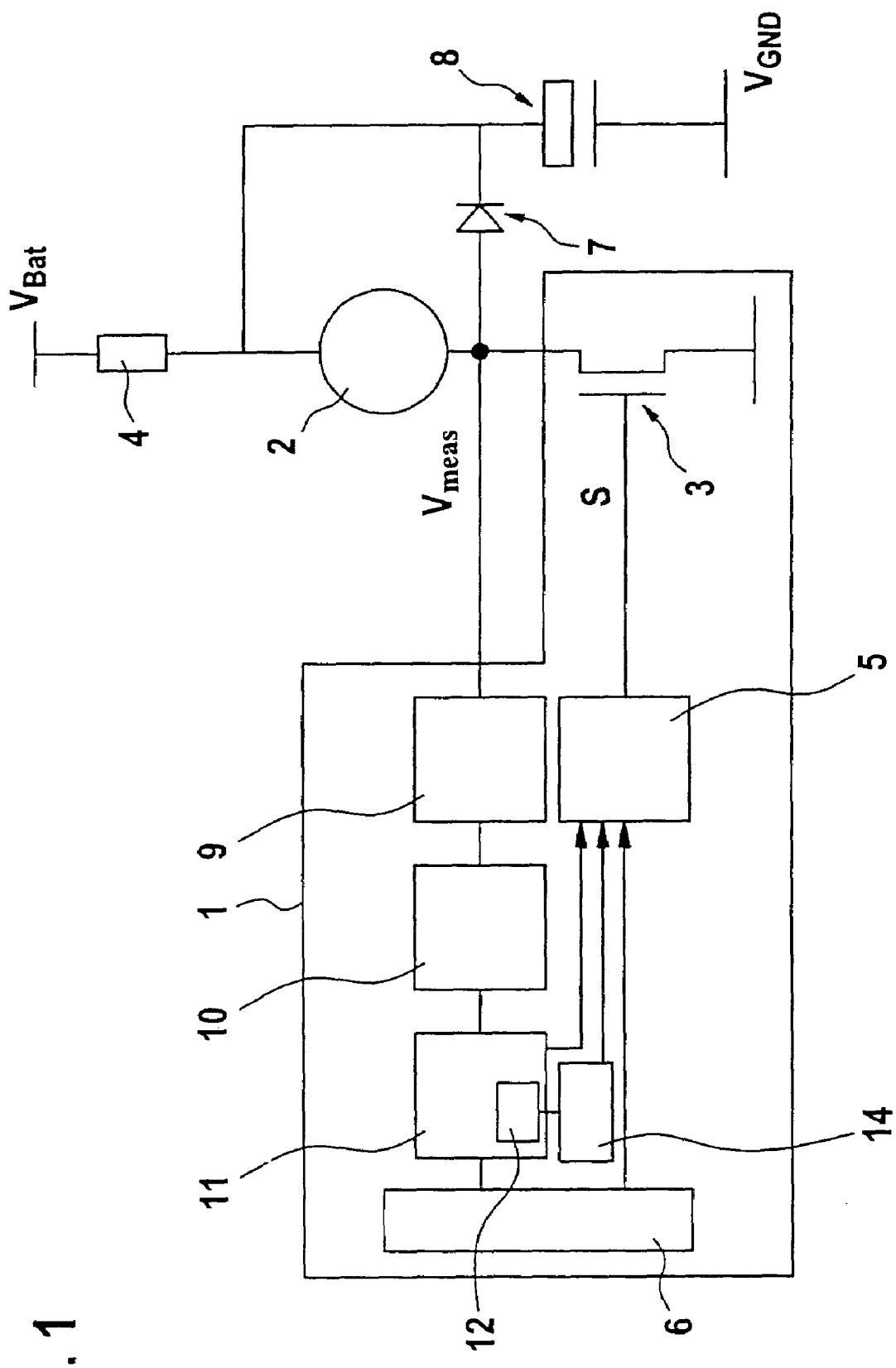
FIG. 1 shows a block diagram of a control circuit according to the present invention according to a first embodiment.

FIG. 1 shows a control circuit 1 according to the present invention according to a first embodiment. Control circuit 1 is used to trigger a connectable fan motor 2 via switching device 3. Switching device 3 is connected to fan motor 2 and a reactor 4 in series. Reactor 4 is used as a low-pass filter. Switching device 3 is preferably implemented as a field-effect power transistor, to whose gate terminal a pulse-width-modulated triggering signal S is applied to control the fan motor. The pulse-width-modulated triggering signal is generated by control circuit 1.

A first supply voltage $V_{Bat}$ is connected to a first terminal of reactor 4 and a second terminal of reactor 4 is connected to a first terminal of connectable fan motor 2. A second terminal of fan motor 2 is connected to a first terminal of field-effect power transistor 3. A second supply voltage potential $V_{GND}$, preferably a ground potential, is applied to the second terminal of field-effect power transistor 3.

Triggering signal S is generated by a pulse width modulation circuit 5, which is located in control circuit 1. Pulse width modulation circuit 5 generates triggering signal S in accordance with a predefined value received via a data interface 6 from a network, e.g., a CAN network.

Triggering signal S is pulse-width-modulated, i.e., it is periodic and has a pulse length, during which a first level is assumed for a specific time and a second level is assumed for the remainder of the time of the pulse length. The first level is preferably a level making switching device 3 conductive, preferably a high level. The second level blocks switching device 3 and is preferably a low level.

The ratio between the length of the first level and the overall pulse length is defined as pulse duty factor Tv. Fan motor 2 may be triggered almost continuously through the free selection of pulse duty factor Tv.

The period length of triggering signal S is preferably predefined according to a triggering frequency which lies above the frequency range audible to the human ear, in order to avoid unpleasant audible oscillations in the triggering electronic system and/or fan motor 2. Preferably, the triggering frequency is at approximately 20 kHz.

A free-wheeling diode 7, which dissipates a voltage peak occurring at the second terminal of fan motor 2 at the first terminal of fan motor 2, is provided so that no voltage peaks are induced in the connection lines by fan motor 2 when switching device 3 is disconnected.

In order to reduce line interference on supply voltage lines because of switching field-effect transistor 3, reactor 4 and a suppression electrolytic capacitor 8 are provided. A first terminal of suppression electrolytic capacitor 8 is connected to the first terminal of fan motor 2 and a second terminal of the capacitor is connected to second supply voltage potential $V_{GND}$, i.e., preferably the ground potential. Reactor 4 and electrolytic capacitor 8 form a low-pass filter.

Control circuit 1 is used for the purpose of triggering fan motor 2 according to a predefined value and, in addition, checking the operating state of fan motor 2. For this purpose, the second terminal of fan motor 2 is connected to a low-pass filter circuit 9 located in control circuit 1. Low-pass filter circuit 9 smooths the voltage signal applied to the second terminal of fan motor 2 and transforms it with the aid of a voltage divider into a voltage range which lies in the measuring range of a measuring circuit 10 connected to filter circuit 9.

Figure 2:
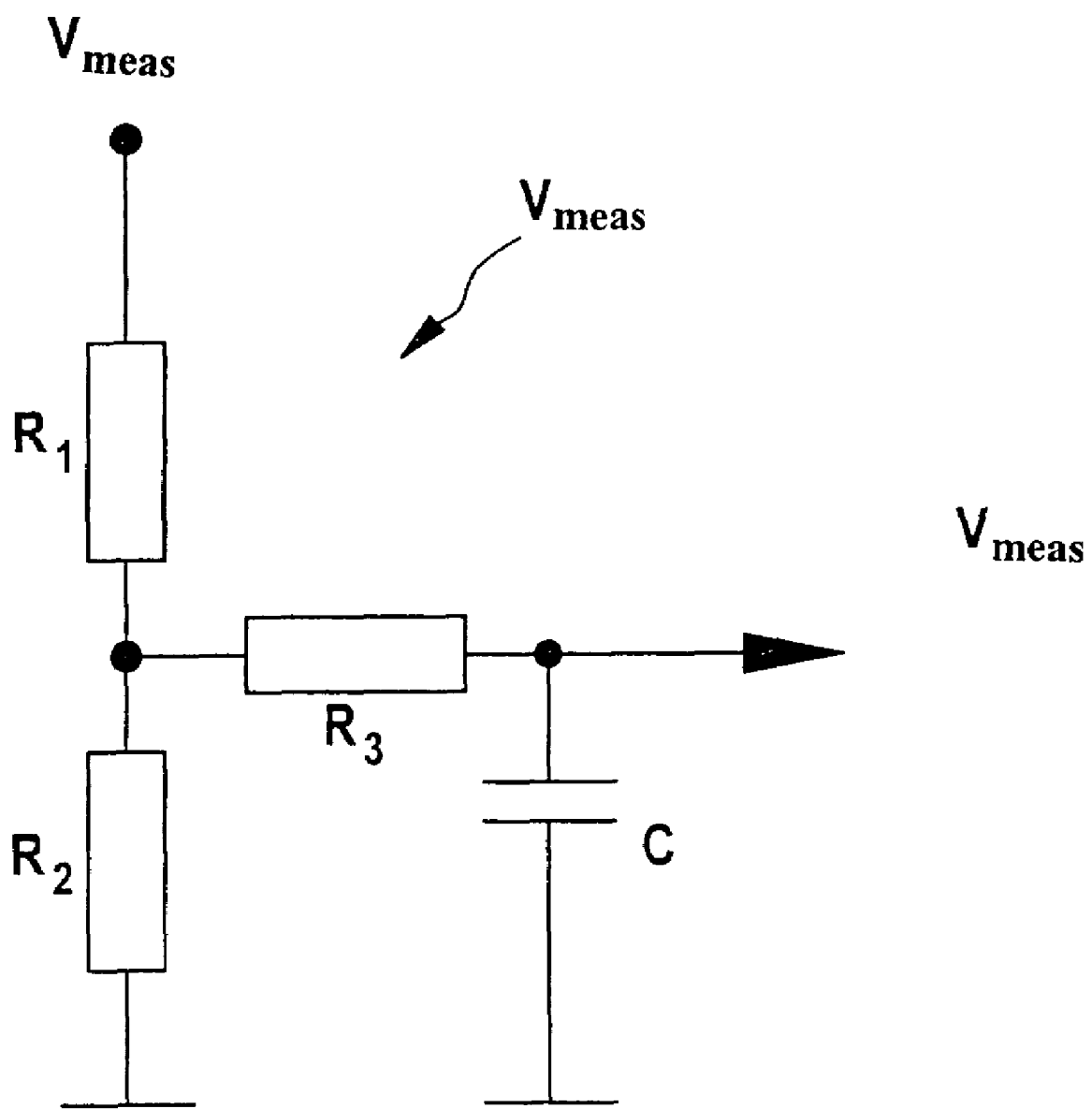
FIG. 2 shows a filter circuit usable in the control circuit according to the present invention.

A possible circuit diagram of such a low-pass filter circuit 9 is illustrated in FIG. 2. Low-pass filter circuit 9 has a first resistor $R_1$ and a second resistor $R_2$, which are connected in series and form a voltage divider. Measured voltage $V_{meas}$ is applied via both resistors $R_1$ and $R_2$ and the measured voltage $V_{meas}'$, which is adapted to the required voltage range, is tapped between first resistor $R_1$ and second resistor $R_2$.

Adapted measured voltage $V_{meas}'$s then applied to a low-pass filter, which is formed by a third resistor $R_3$ and a capacitor C, so that a direct component is output to following measuring circuit 10, which is essentially proportional to pulse duty factor Tv of triggering signal S.

The voltage measured in measuring circuit 10 is essentially proportional to pulse duty factor Tv of triggering signal S and is a function of supply voltage $V_{Bat}$-$V_{GND}$ applied to fan motor 2. Measuring circuit 10 preferably has an A/D converter which digitizes the measured voltage. The digitized voltage value is relayed to an analyzer circuit 11, which checks during operation whether fan motor 2 is in normal operation or whether there is a fault. The operating state which was determined by analyzer circuit 11 may be output to a data bus via data interface 6.

Figure 3:
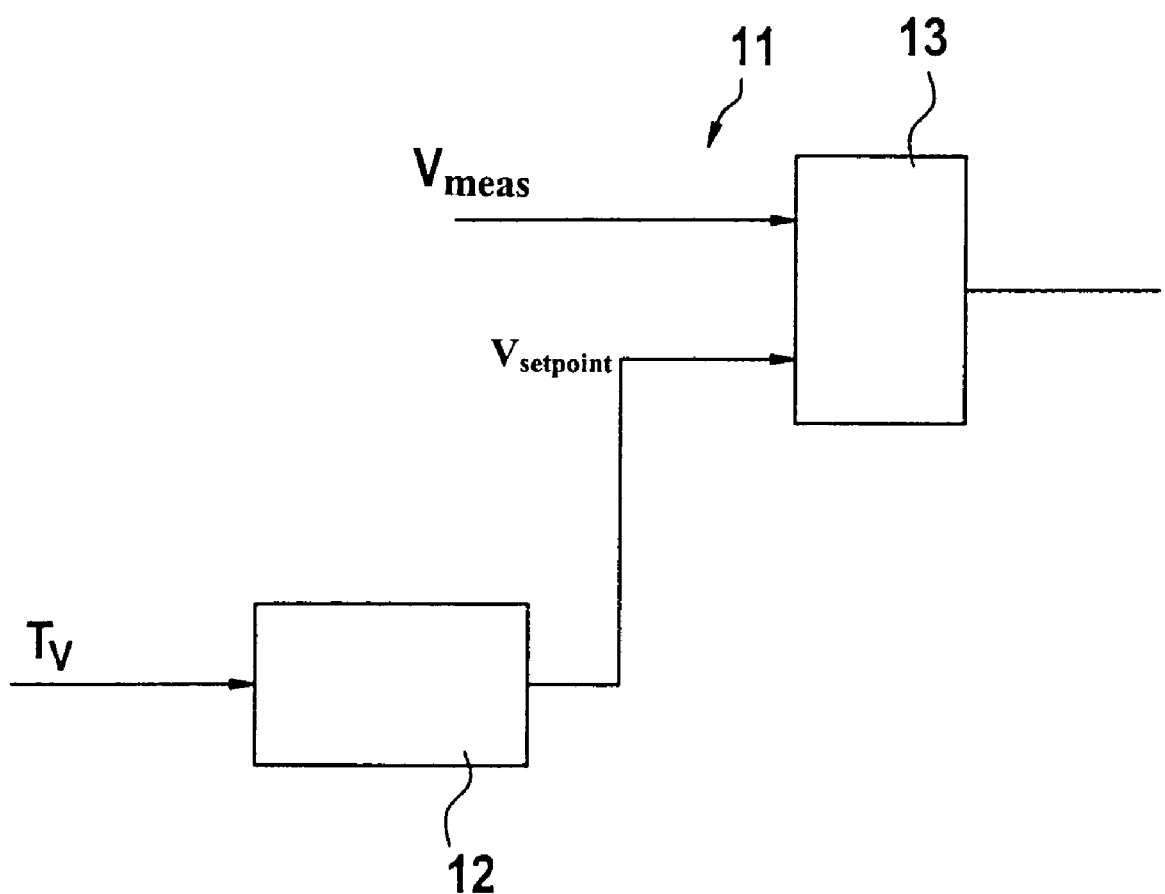
FIG. 3 shows a block diagram of a control circuit according to the present invention.

A block diagram of a possible analyzer circuit 11 is illustrated in FIG. 3. Analyzer circuit 11 has a data memory 12 in which a table containing reference voltage values is stored. A reference voltage value $V_{setpoint}$ is transmitted to a comparator circuit 13 in accordance with pulse duty factor Tv of triggering signal S generated by pulse width modulation circuit 5. Comparator circuit 13 also receives the measured voltage value digitized by measuring circuit 10 and compares the two voltage values. If the two voltages deviate from one another by more than a threshold quantity, and/or if measured voltage value $V_{meas}$ is outside a range defined by the reference voltage value, it is determined that fan motor 2 is not in normal operation. If measured voltage $V_{meas}'$ is above the upper threshold voltage predefined by reference voltage $V_{setpoint}$, it is determined that fan motor 2 is being operated using an overvoltage. In this case, an overvoltage fault is recognized, which is relayed to data interface 6.

If adjusted measured voltage $V_{meas}'$ is essentially at the voltage value of second supply voltage potential $V_{GND}$, i.e., ground potential, independently of the applied pulse duty factor, an open-load fault is recognized, i.e., no current flows through fan motor 2. This indicates a defect of the connection lines of fan motor 2 and/or a defect within fan motor 2. For example, such a defect may include brushes and/or collectors being oxidized. In order to rule out and/or correct such a fault, the analyzer circuit may briefly trigger pulse width modulation circuit 5, so that field-effect transistor 3 is made completely conductive for a short time, so that the entire supply voltage is applied across fan motor 2. It is thus possible to clean an oxide layer from brushes and/or collectors, so that fan motor 2 becomes operational again.

An undervoltage may also be determined using comparator circuit 13 if the measured voltage is below the normal operating range predefined by reference voltage value $V_{setpoint}$.

For determining reference voltage values $V_{setpoint}$ in reference voltage values stored in data memory 12, a compensating circuit 14 is provided, which generates the corresponding table before fan motor 2 is put into operation. For this purpose, a defined supply voltage $V_{Bat}$ is applied to fan motor 2 and the measured voltage is measured via measuring circuit 10 at different pulse duty factors Tv. It is now possible for compensating circuit 14 to write a voltage value in the data memory for each possible pulse duty factor Tv. In addition, it is possible for voltage values to be determined for some specific pulse duty factors Tv, and for further reference voltage values to be determined through interpolation between the measured voltage points. This is possible since adjusted measured voltage $V_{meas}'$ is essentially proportional to the applied pulse duty factor.

Figure 4:
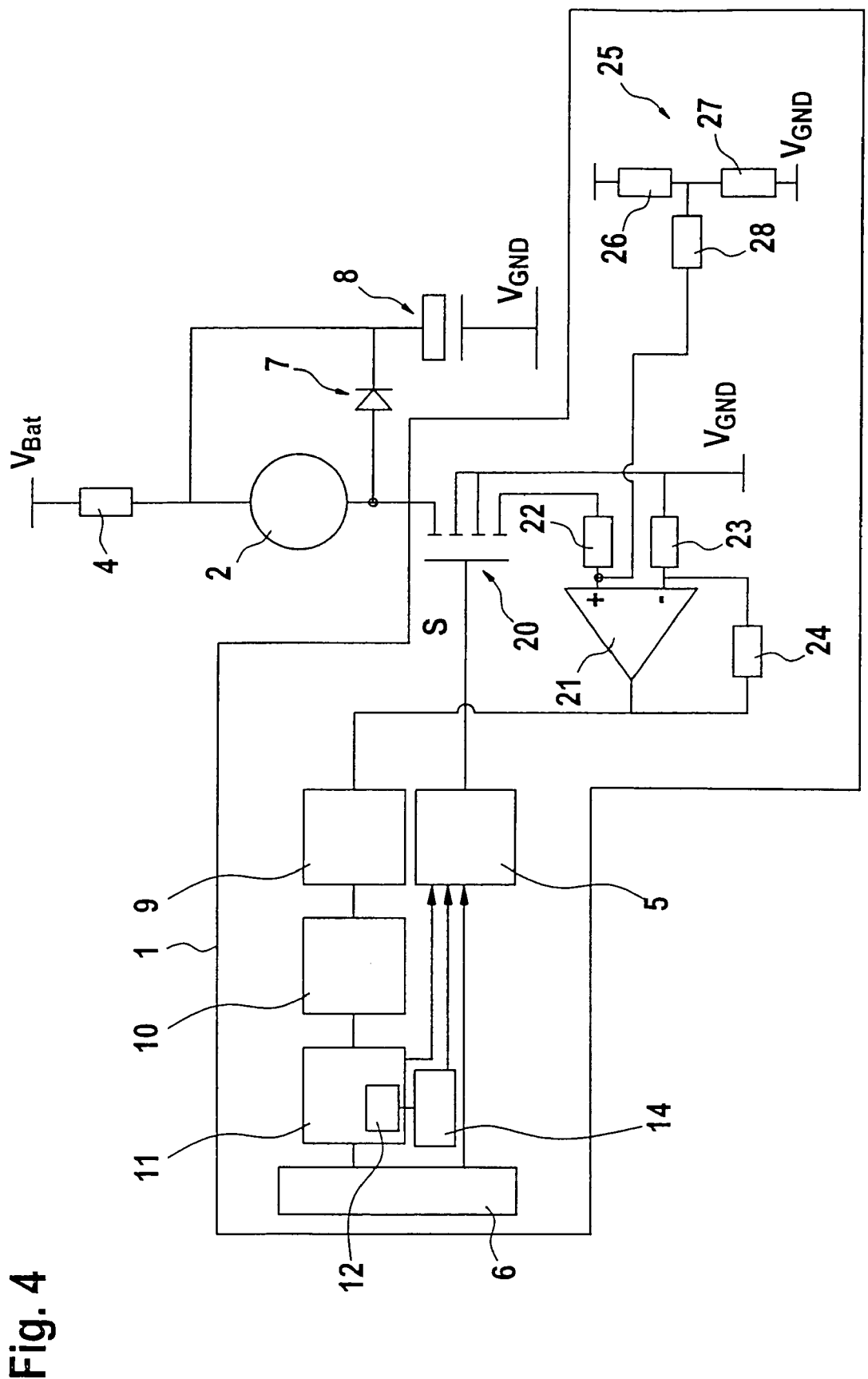
FIG. 4 shows a block diagram of a control circuit according to the present invention according to a second embodiment.

A further embodiment of the present invention is illustrated in FIG. 4. The embodiment illustrated in FIG. 4 is a circuit in which the operating state of fan motor 2 is determined by the motor current flowing through fan motor 2. In order to measure the motor current as efficiently as possible, a sense FET 20 is provided as switching device 3, which, in addition to the function of a typical field-effect transistor, also has a current output that provides a current proportional to the motor current flowing through sense FET 20 between drain and source of sense FET 20. Through the use of a sense FET 20, a measuring resistor may be dispensed with, which must otherwise be connected in series with fan motor 2 in order to measure the motor current. Such a measuring resistor reduces the supply voltage applied to the motor and decreases its power.

In order to provide the measured motor current of control circuit 1 as a usable measured variable, the measured current of the measuring input of sense FET 20 must be converted into a measured voltage proportional thereto. This is performed by an operational amplifier 21, whose non-inverting input is connected to the measured current via a first resistor 22. The inverting input of operational amplifier 21 is connected via a second resistor 23 to the source terminal of sense FET 20. A control terminal of sense FET 20 is connected to control signal S, which is provided by the control circuit. The source terminal of sense FET 20 is also connected to a ground potential $V_{GND}$.

The inverting terminal of operational amplifier 21 is connected to the output of operational amplifier 21 via a third resistor 24. The output of operational amplifier 21 provides the measured voltage, which is essentially proportional to the measured current. The voltage at the output of the operational amplifier is provided as the measured voltage to control circuit 1. Since the inputs of operational amplifier 20 typically have a high resistance, it is necessary to connect the non-inverting input of operational amplifier 20 to a voltage divider to convert the line current into a voltage. Voltage divider 25 has a fourth and a fifth resistor, which are connected in series and to which the first supply voltage potential and ground potential $V_{GND}$ are applied. A voltage, which is connected via a sixth resistor 28 to the non-inverting input of operational amplifier 20, is picked up between fourth and fifth resistors 26, 27. In this way, the measured current may flow via first resistor 22, sixth resistor 28, and one of fourth or fifth resistors 26, 27. The voltage at the non-inverting input of operational amplifier 20 is then proportional to the measured current, an offset being predefined by voltage divider 25. The gain of the operational amplifier is set by second and fourth resistors 23, 24.

On the basis of the measured voltage, it may be determined whether fan motor 2 is in normal operation, or whether fan motor 2 is blocked or sluggish.

If fan motor 2 is blocked or sluggish, the measured current lies above the current range valid in normal operation. If the measured current is elevated, the resulting measured voltage is also elevated, so that control circuit 1 determines that the measured current is not in a defined current range. Such a malfunction may then be communicated to other system components via data interface 6, for example.

Control circuit 1 of the second embodiment essentially operates like control circuit 1 of the first embodiment. Control circuit 1 may also have multiple inputs for measured voltages, a measured voltage between fan motor 2 and switching device 20 and also a proportional voltage determined from the measured current able to be provided at an input of control circuit 1. This may also be used for the plausibility check for the operating state "normal operation".

Control circuit 1, switching device 3, reactor 4, freewheeling diode 7, and suppression electrolytic capacitor 8 are preferably constructed modularly. The module thus formed has two terminals for fan motor 2.

Pulse width modulation circuit 5, measuring circuit 10, analyzer circuit 11, and compensating circuit 14, as well as data interface 6, are preferably implemented by a corresponding program in a microcontroller, so that the circuitry complexity is low. The microcontroller may be used for triggering more than one fan motor 2.

What is claimed is:

1. A method for determining an operating state on triggering a fan motor, comprising:
    operating the fan motor via a switching device;
    triggering the switching device via a pulse-width-modulated triggering signal, a pulse duty factor of the triggering signal predefining a triggering state of the fan motor;
    measuring as a measured variable one of a voltage potential at a node between the fan motor and the switching device and a motor current;
    determining an operating state on triggering the fan motor as a function of the measured variable and the pulse duty factor;
    recognizing an open load fault if the voltage potential essentially corresponds to a supply voltage potential of the fan motor applied to the switching device; and
    upon recognition of an open load fault, switching the switching device through for a specific period of time, in order to apply a maximum voltage to the fan motor, so that merely oxidized connection points are cleaned.

2. The method as recited in claim 1, further comprising:
    smoothing the measured variable by low-pass filtering the measured variable.

3. The method as recited in claim 1, further comprising:
    recognizing an overvoltage fault if a measured voltage potential is above the defined voltage range.

4. The method as recited in claim 1, further comprising:
recognizing one of a blocking and a sluggishness of the fan motor if the motor current is outside a defined current range.

5. The method as recited in claim 4, further comprising:
    determining the defined current range by a measurement at a defined applied supply voltage at different pulse duty factors.

* * * * *

UNITED STATES PATENT AND TRADEMARK OFFICE
CERTIFICATE OF CORRECTION

| | | |
|---|---|---|
| PATENT NO. | : 7,595,605 B2 | Page 1 of 1 |
| APPLICATION NO. | : 10/550719 | |
| DATED | : September 29, 2009 | |
| INVENTOR(S) | : Buerk et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 545 days.

Signed and Sealed this

Twenty-eighth Day of September, 2010

David J. Kappos
*Director of the United States Patent and Trademark Office*